C. E. O. HAGER.
CLUTCH.
APPLICATION FILED JULY 16, 1910.
1,029,607.
Patented June 18, 1912.
2 SHEETS—SHEET 1.
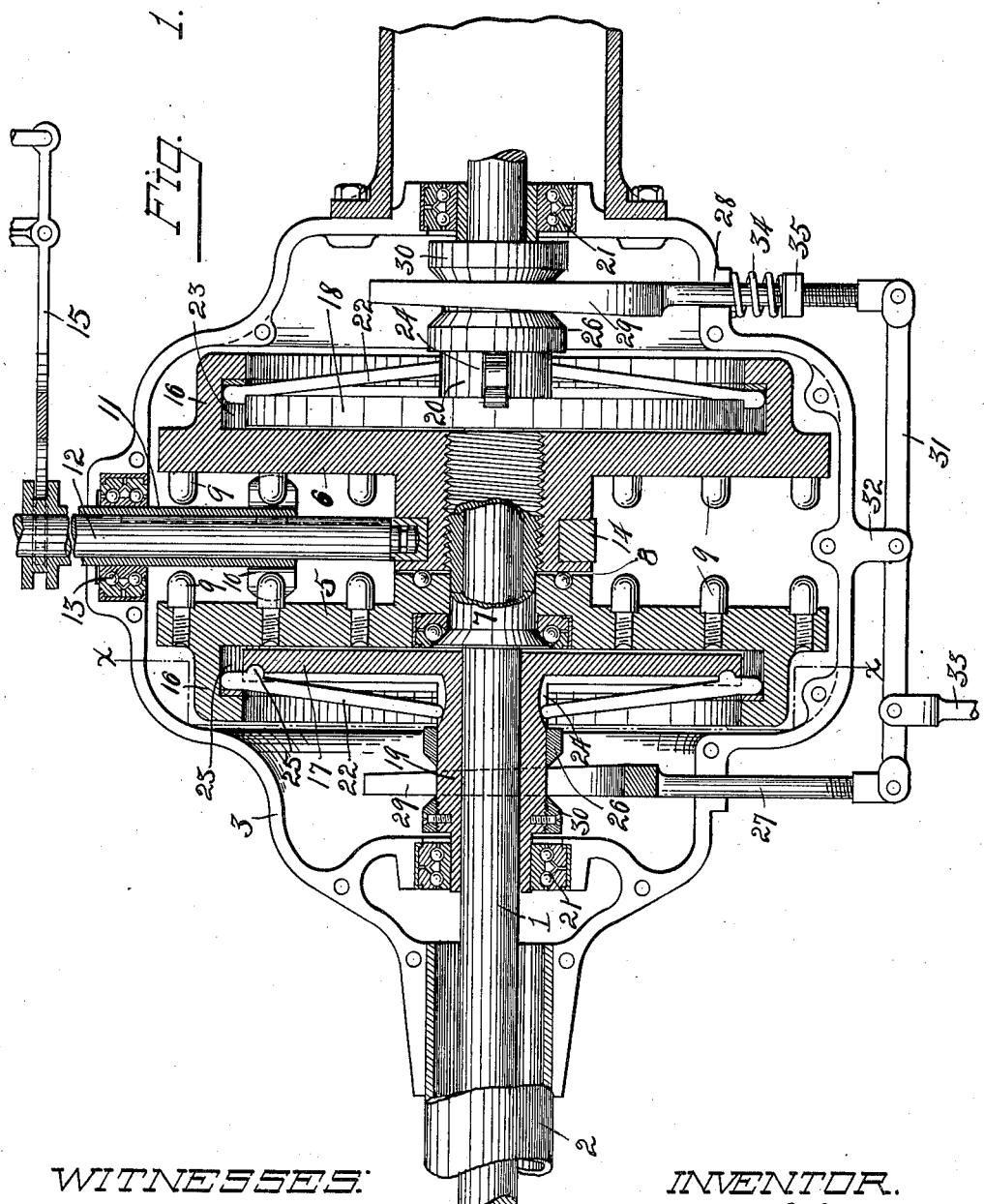
WITNESSES:
C. H. Bills.
M. G. Gaskell.
INVENTOR.
Charles E. O. Hager,
By Owen T Owen,
His attys.

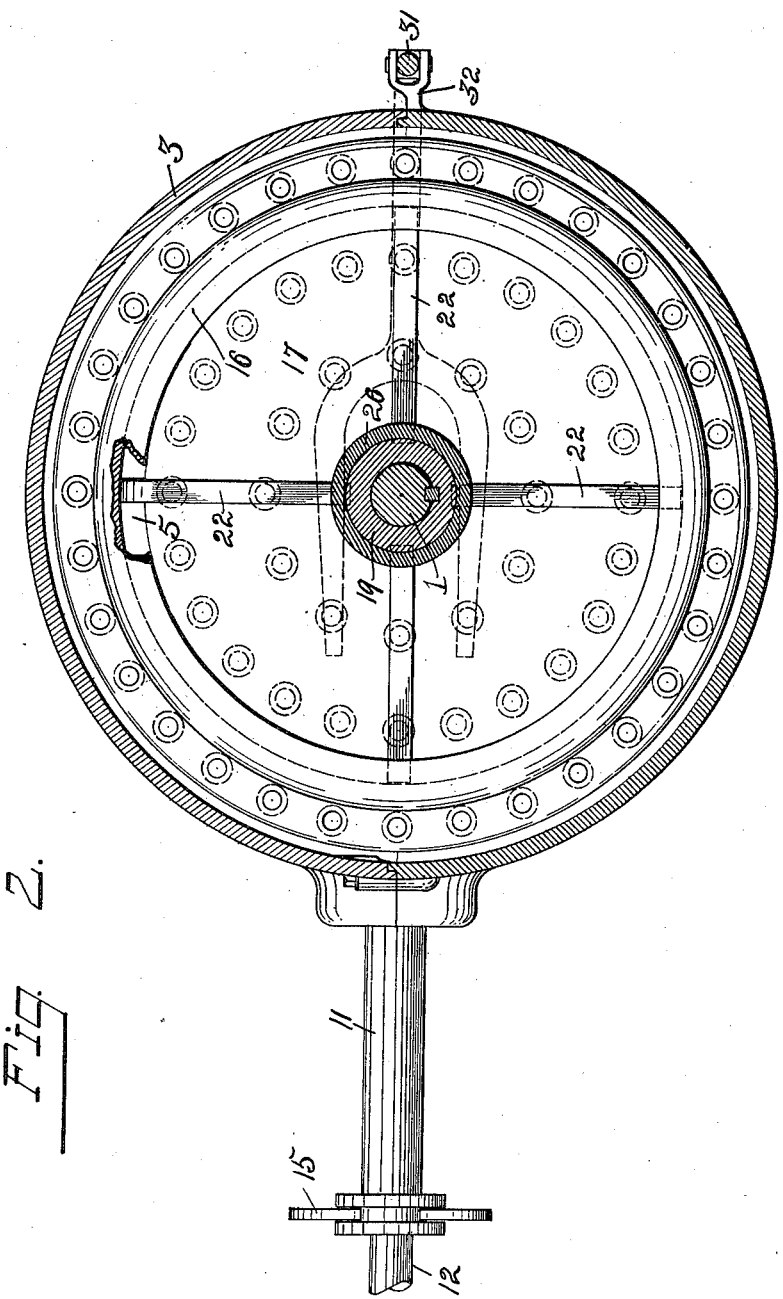

UNITED STATES PATENT OFFICE.

CHARLES E. O. HAGER, OF TOLEDO, OHIO.

CLUTCH.

1,029,607.   Specification of Letters Patent.   Patented June 18, 1912.

Application filed July 16, 1910. Serial No. 572,237.

*To all whom it may concern:*

Be it known that I, CHARLES E. O. HAGER, a citizen of the United States, and a resident of Toledo, in the county of Lucas and State of Ohio, have invented a new and useful Clutch; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to power transmission mechanisms, and more particularly to clutches for use in connection with such mechanisms, but is not restricted to such use as it may be used in any connection with which it is applicable.

The object of my invention is the provision of simple and compact means of this character, which is strong, durable and economical in its construction, easy of operation, and composed of a minimum number of parts, whereby to enhance its practicability and commercial value.

The invention is fully described in the following specification, and while in its broader aspect it is capable of embodiment in numerous forms, a preferred form thereof is illustrated in the accompanying drawings, in which,—

Figure 1 is a central longitudinal section of the mechanism comprising my invention, with parts in full and broken away, and Fig. 2 is a cross-section thereof on the line $x$ $x$ in Fig. 1 with a portion broken away.

Referring to the drawings, 1 designates the driven shaft or axle of the mechanism, 2 the case for such shaft, and 3 the case or housing for the power transmission parts.

Mounted on the shaft 1 within the case 3 are the two disks or rotary members 5 and 6, one of which is mounted loosely on one end portion of a sleeve 7; which is in turn mounted for free rotary movements on the shaft 1, while the other disk is shown, in the present instance, as being threaded to the opposite end portion of such sleeve, thus adapting the two disks to have relative rotary movements on the shaft. The disk which is loosely mounted on the sleeve 7 has an outward ball-bearing thrust against a conical shoulder on the sleeve end as shown. The disks also preferably have a ball-bearing thrust between their inner hub ends, as shown at 8.

The members 5 and 6 are provided on their inner faces with a plurality of registering sets of annular concentric rows of pin teeth 9, with which a drive pinion 10 may mesh. This pinion is secured to a sleeve 11, that is feathered to a drive shaft 12, which may be the motor shaft of the vehicle and is movable, longitudinally of the shaft 12 radially of the shaft 1 to place it into mesh with any of the sets of teeth 9 on the two members 5 and 6, or it may be placed in neutral position between such sets, as is apparent. The sleeve 11 is shown as being slidingly mounted in a suitable bearing 13 in one side of the housing and the shaft 12 has its inner end journaled in a bearing opening in a collar 14, which, in the present instance, loosely encircles the inwardly extended hub portion of the member 6. The sleeve 11 is shifted to throw its gear 10 into mesh with different ones of the teeth 9, by the working of a shift-lever 15, which is in forked engagement with the sleeve and is connected to suitable control parts.

The members 5 and 6 are provided on their outer faces adjacent their peripheries with outwardly and inwardly extending annular flanges 16, one of which overhangs a friction disk 17 on the shaft 1 at the outer side of the member 5, while the other overhangs a friction disk 18 on said shaft at the outer side of the member 6. The disks 17 and 18 are carried at the inner ends of sleeves 19 and 20, respectively, which are feathered on the shaft 1, and are shown as having their outer ends journaled in suitable bearings 21 in the ends of the case 3.

Each friction disk 17 and 18 carries a plurality of radially extended levers 22, which are fulcrumed to the outer sides of the respective disks at or adjacent their edges, and have their outer short arms projecting outwardly within the annular groove or recess 23 formed by the associated flange 16 and their long arms extending toward the shaft 1 with their free ends working within registering recesses 24 provided longitudinally in the associated sleeve 19—20. The disks 17—18 are also radially recessed on their faces for the levers 22 to work in. The levers 22 are provided at their fulcrum points with rounded bearing lugs 25, which seat loosely in correspondingly shaped recesses in the respective friction disks, and are held to their seats due to the levers coacting at their outer ends with the inwardly turned edge of the associated flange 16, and at their inner ends with the inner edge of a collar 26, which is mounted for longitudinal movements on the associated sleeve 19—20. To frictionally unite either disk 17—18 to its member or drive gear 5—6, respectively, to cause the engaged disk and gear to rotate in unison, the associated collar 26 is moved inwardly, thus oscillating the coacting set of levers 22 to cause the outer end portions thereof to act on the flange 16 and outer edge of the coacting disk to separate them and cause the contiguous faces of such disk and the coacting drive-gear 5—6 to frictionally bind.

27 and 28 designate rods which are forked at one end as at 29, and respectively straddle the sleeves 19 and 20 between the collars 26 thereon and the fixed shoulders or collars 30 on such sleeves. The furcations of the forks 29 are longitudinally tapered to adapt them when moved in one direction transversely of the sleeves 19—20 to have a wedge-like action on the coacting collars 26 and 30 whereby to force the collars 26 inwardly to move the associated set of levers 22, as is apparent. The rods 27 and 28 work through registering openings in the case 3 and connect without the case to opposite ends of a rock-arm 31, which is pivoted at its center to a case lug 32. A rod 33 connects the rock-arm with any suitable control means. A coiled compression spring 34 is mounted in the present instance, on the rod 28 without the case 3, and has its ends thrust against the case and a nut 35 threaded on the rod 28, thus tending to normally retain the rod 27 in clutch-engaging position and the rod 28 retracted from such position.

It is apparent with this form of power transmission mechanism that the parts 5 and 17 when in clutch engagement serve to communicate rotation in one direction at various speeds from the drive pinion 10 to the driven shaft 1, and that the parts 6 and 19 when in clutch engagement serve to communicate rotation in a reverse direction at various speeds from said pinion to the shaft 1; and also that the forked rods 27 and 28 can be placed in neutral position so that both clutches are disengaged to permit both of the members 5 and 6 to run loosely on the shaft 1, or the arm 31 may be rocked to cause an engagement of either clutch disk 17—18 with its member 5—6.

I wish it understood that my invention is not limited to any specific construction or arrangement of the parts except in so far as such limitations are specified in the claims.

Having thus described my invention, what I claim as new and desire to secure by Letters Patent, is,—

1. In combination, a shaft, a member mounted for rotation on said shaft and having an annular laterally and inwardly projecting flange, a friction clutch part secured to the shaft for rotation therewith, a plurality of levers radially carried by said clutch part, said levers being fulcrumed to the clutch part adjacent its outer edge and having their outer ends positioned to act with the inturned portion of said flange to draw said member and clutch part together when the inner ends of the levers are moved in one direction, and means shiftable to impart clutch engaging movements to said levers.

2. In combination, a shaft, two coöperating clutch members mounted on said shaft and one having a laterally projecting annular flange with a portion at least of the other member disposed therein, one of said members being loose on the shaft, a plurality of levers radially carried by the inner member with their fulcrums in loose thrust contact with said inner member adjacent the outer edge thereof and their outer ends adapted to coact with said flange to effect a drawing together of the clutch members when the levers are oscillated in one direction and means for controlling the movements of said levers.

3. In combination, a pair of clutch members, one being secured to the shaft for rotation therewith and having an annular flange which overhangs the other member, the inner member being provided with notches adjacent its outer edge, levers radially carried by the notched member and having fulcrum lugs adjacent their outer ends loosely seating in said notches and their ends disposed to coact with said flange to effect a drawing together of the clutch members when the inner ends of the levers are moved in one direction and means for controlling the movements of the levers.

In testimony whereof, I have hereunto signed my name to this specification in the presence of two subscribing witnesses.

CHARLES E. O. HAGER.

Witnesses:
C. W. OWEN,
G. GASKELL.

Copies of this patent may be obtained for five cents each, by addressing the "Commissioner of Patents, Washington, D. C."